(12) United States Patent
Andersen et al.

(10) Patent No.: US 10,358,259 B2
(45) Date of Patent: Jul. 23, 2019

(54) APPARATUS AND METHOD

(71) Applicant: Castrol Limited, Berkshire (GB)

(72) Inventors: Jens Andersen, Berkshire (GB); Steven Paul Goodier, Berkshire (GB); Hanna Hellman, Berkshire (GB); Andrea Leeson, West Malling (GB)

(73) Assignee: Castrol Limited, Reading (GB)

( * ) Notice: Subject to any disclaimer, the term of this patent is extended or adjusted under 35 U.S.C. 154(b) by 174 days.

(21) Appl. No.: 15/312,873

(22) PCT Filed: May 21, 2015

(86) PCT No.: PCT/EP2015/061339
§ 371 (c)(1),
(2) Date: Nov. 21, 2016

(87) PCT Pub. No.: WO2015/177321
PCT Pub. Date: Nov. 26, 2015

(65) Prior Publication Data
US 2017/0190466 A1   Jul. 6, 2017

(30) Foreign Application Priority Data

May 21, 2014   (GB) .................................. 1409077.3

(51) Int. Cl.
| | |
|---|---|
| *G07G 1/00* | (2006.01) |
| *G07F 7/06* | (2006.01) |
| *B65D 19/00* | (2006.01) |
| *B65D 71/00* | (2006.01) |
| *G08B 21/18* | (2006.01) |
| *B65D 19/44* | (2006.01) |
| *G06Q 10/08* | (2012.01) |

(52) U.S. Cl.
CPC ............. *B65D 19/44* (2013.01); *B65D 19/00* (2013.01); *B65D 71/0096* (2013.01); *G07F 7/0609* (2013.01); *G07G 1/009* (2013.01); *G08B 21/18* (2013.01); *B65D 2203/10* (2013.01); *B65D 2519/00815* (2013.01); *G06Q 10/087* (2013.01)

(58) Field of Classification Search
CPC .... B65D 19/00; B65D 19/44; B65D 71/0096; B65D 2203/10; B65D 2519/00815; G07F 7/0609; G07G 1/009; G08B 21/18
USPC ......................................................... 340/603
See application file for complete search history.

(56) References Cited

U.S. PATENT DOCUMENTS

| | | | |
|---|---|---|---|
| 4,151,823 A | 5/1979 | Grosse et al. | |
| 5,454,354 A | 10/1995 | Miller | |
| 5,597,284 A * | 1/1997 | Weltlich ................. | B65B 5/068 198/418.6 |

(Continued)

FOREIGN PATENT DOCUMENTS

| | | |
|---|---|---|
| CN | 101421165 | 4/2009 |
| CN | 202765425 | 3/2013 |

(Continued)

*Primary Examiner* — Jacques M Saint Surin
(74) *Attorney, Agent, or Firm* — McDonnell Boehnen Hulbert & Berghoff LLP (57) ABSTRACT

A pallet comprising: a plurality of container seats wherein each seat is adapted to carry a fluid container; a data obtainer arranged to obtain container data from a data provider carried by a fluid container to be carried; a processor coupled to the data obtainer and configured to provide a signal based on the container data.

30 Claims, 4 Drawing Sheets

(56) References Cited

U.S. PATENT DOCUMENTS

| | | | |
|---|---|---|---|
| 6,068,032 A * | 5/2000 | Milner | F16N 31/002 |
| | | | 141/10 |
| 6,483,434 B1 * | 11/2002 | Umiker | B65D 25/205 |
| | | | 340/5.92 |
| 9,869,219 B2 | 1/2018 | Barnes et al. | |
| 9,878,822 B2 | 1/2018 | Barnes et al. | |
| 9,890,901 B2 | 2/2018 | Brett et al. | |
| 9,938,867 B2 | 4/2018 | Brett et al. | |
| 2003/0079777 A1 * | 5/2003 | Mitchell | B67D 7/0277 |
| | | | 137/205 |
| 2006/0232412 A1 | 10/2006 | Tabacman et al. | |
| 2011/0253092 A1 | 10/2011 | Springer et al. | |
| 2012/0075071 A1 * | 3/2012 | Liu | B65D 19/001 |
| | | | 340/10.1 |
| 2012/0211397 A1 | 8/2012 | Kilian | |
| 2013/0048531 A1 * | 2/2013 | Nicoletti | A61M 5/002 |
| | | | 206/557 |
| 2015/0292372 A1 | 10/2015 | Barnes et al. | |
| 2017/0089234 A1 | 3/2017 | Dawson et al. | |
| 2017/0089235 A1 | 3/2017 | Dawson et al. | |
| 2017/0089236 A1 | 3/2017 | Andersen et al. | |
| 2017/0101911 A1 | 4/2017 | Barnes et al. | |
| 2017/0107873 A1 | 4/2017 | Ali et al. | |
| 2017/0122151 A1 | 5/2017 | Brett et al. | |
| 2017/0183992 A1 | 6/2017 | Barnes et al. | |
| 2017/0197596 A1 | 7/2017 | Barnes et al. | |

FOREIGN PATENT DOCUMENTS

| | | |
|---|---|---|
| DE | 298 12 678 | 10/1998 |
| DE | 102012024365 | 6/2014 |
| EP | 2109059 | 10/2009 |
| JP | 09-270033 | 10/1997 |
| JP | 2001 356688 | 12/2001 |
| WO | 03/081525 | 10/2003 |
| WO | 2007042021 | 4/2007 |
| WO | 2007092959 | 8/2007 |
| WO | 2011135085 | 11/2011 |
| WO | 2013/188583 | 12/2013 |
| WO | 2016/158971 | 10/2016 |

\* cited by examiner

Figure 1

Section A-A

Figure 2

Figure 3

APPARATUS AND METHOD

CROSS REFERENCE TO RELATED APPLICATIONS

The present application is a National Phase application of, and claims the benefit of, International (PCT) Application No. PCT/EP2015/061339, filed on May 21, 2015, which claims priority to GB Application No. 1409077.3, filed on May 21, 2014, the entire contents of both which are incorporated herein by reference.

This invention relates to transport apparatus and associated methods for the collection and transportation of replaceable fluid containers for vehicles and engines.

Many vehicle engines use one or more fluids for their operation. Such fluids are often liquids. For example, internal combustion engines use liquid lubricating oil compositions. Also, electric engines use heat exchange liquids for example to cool the engine, to heat the engine or to cool and heat the engine during different operating conditions. Such fluids are generally held in reservoirs associated with the engine and may require periodic replacement.

Conventional periodic replacement of engine lubricating oil composition in a vehicle engine usually involves draining the composition from the engine sump. The process may also involve removing and replacing the engine oil filter. Such a procedure usually requires access to the engine sump drain plug and oil filter from the underside of the engine, may require the use of hand tools and usually requires a suitable collection method for the drained lubricating oil composition. Attempts have been made to provide a quick-change oil filter/reservoir system for an internal combustion engine.

Other closed circulation fluid systems also exist. In particular hydraulic systems, and heat exchangers such as refrigeration apparatus and heat pumps provide examples of fluid circulation systems in which the performance qualities of the fluid may degrade over time. In this context too, attempts have been made to provide quick change fluid reservoirs which enable the fluid to be refreshed without the need for expensive or expert maintenance.

Having replaced used fluids with fresh stock, it may be desirable to recycle them. Historically however, the recycling of such fluids has been problematic.

Embodiments of the present disclosure may be useful in the recycling of such fluids because they may permit the collection and distribution of fluids to and from consumers in a manner which can be reliably verified and traced.

Aspects and embodiments of the present disclosure are set out in the appended claims.

Some embodiments will now be described, by way of example only, with reference to the accompanying description, in which.

In the drawings like reference numerals are used to indicate like elements.

The present disclosure relates to the collection and transportation of fluid containers to enable fluids they contain to be recycled. Embodiments of the disclosure enable the fluid carried in collected containers to be efficiently and reliably identified so that it can be recycled by an appropriate method. Embodiments of the disclosure may also reduce cross contamination between different but apparently similar fluids which are best recycled separately.

An embodiment of the disclosure provides pallet comprising a plurality of container seats. Each of these seats is adapted to carry a fluid container, and may be operable to retain a container, or to reject it based on data obtained from the container.

Figure 1:
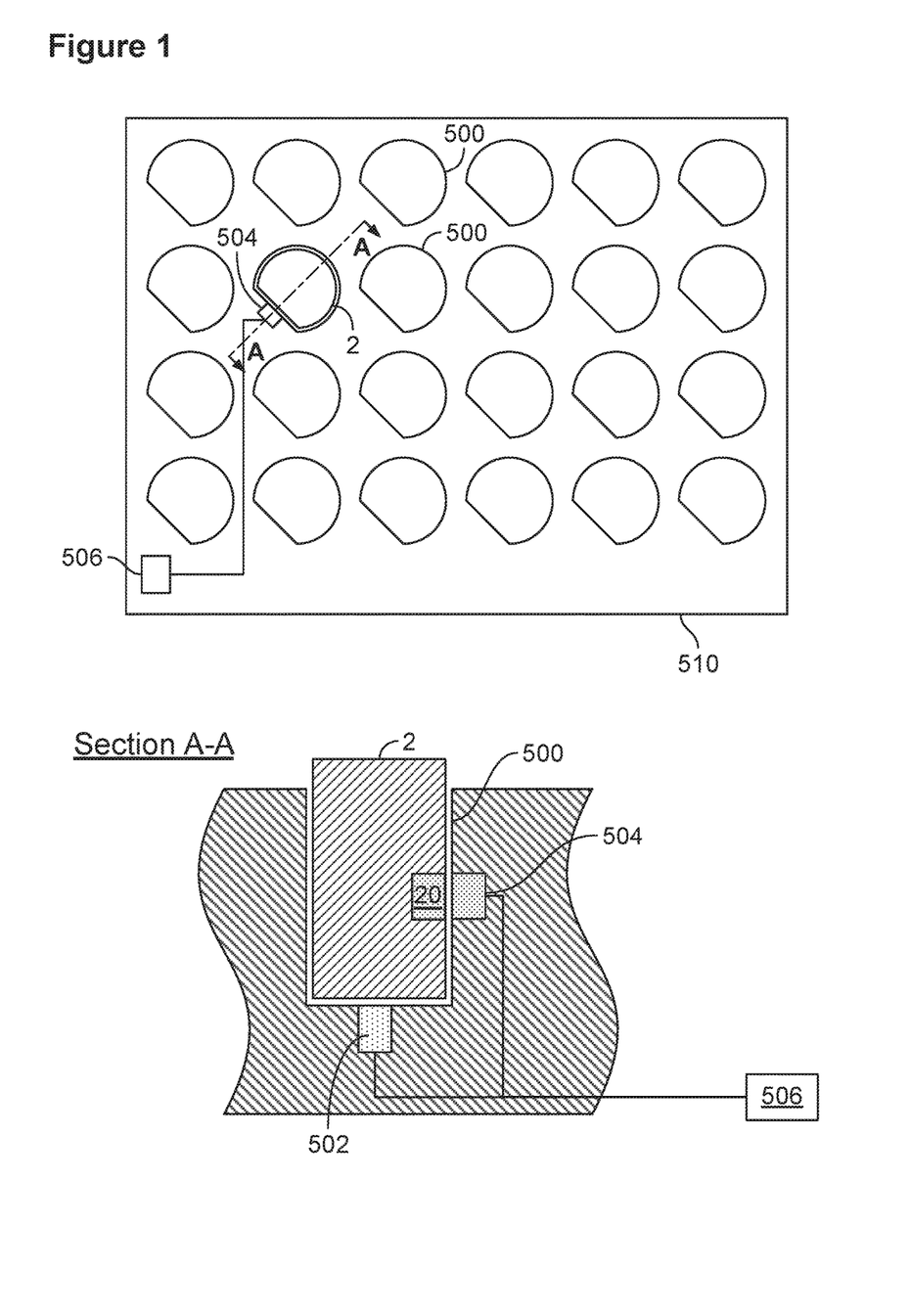
FIG. 1 shows a schematic plan view of a pallet for transporting fluid containers, and includes an illustration of a part section of the pallet.

FIG. 1 shows a plan view of one such pallet 510, inset in FIG. 1 is Section A-A. Section A-A illustrates a part section through the pallet 510 along the line indicated A-A on the plan view in the main part of FIG. 1.

The pallet 510 illustrated in FIG. 1 comprises a plurality of container seats, a data obtainer 504, and a processor 506. As illustrated in FIG. 1, the pallet 510 illustrated in FIG. 1 is carrying a fluid container using one of the container seats. As illustrated in FIG. 1 Section A-A, a restraint 502, such as a latch, may be arranged for selectively restraining a container in position in a container seat 500.

An array of container seats is disposed on the pallet 510 illustrated in FIG. 1. Coupled to each container seat 500 is a data obtainer 504 that is arranged for obtaining data from a container associated with that container seat 500. The data obtainers are coupled to a processor 506 and configured to provide the container data to the processor 506. FIG. 1 Section A-A illustrates an arrangement in which the processor 506 is coupled to the latch.

The container seats illustrated in FIG. 1 Section A-A comprise recesses adapted to hold a container in place on the pallet 510. The container seats are configured so that, when a container is positioned in the recess, and the latch is engaged with the container to restrain it, the data obtainer 504 is arranged for obtaining data from a data provider 20 carried by the container. For example, as shown the container seat 500 and latch are arranged so that, in order to be read by the data obtainer 504, the container must be in position on the latch.

The container seats illustrated in FIG. 1 are of complementary form to the containers which they are intended to receive. This can control the orientation and perhaps also the position of a container in the container seat 500. For example the container seats may be keyed, for example they may be in some way asymmetric, for example they may be non-circular, or part circular in cross section. A fluid container can be carried by the container seat 500 and the arrangement of the fluid container (for example its position, for example its orientation) may be controlled by the geometry of the container seat 500. The position of the data obtainer 504 may be selected according to this geometry so that when a container is disposed in the container seat 500 it is positioned to obtain data from a particular selected part of the container. This is one way in which the container seat 500 can be arranged to ensure that, when positioned to be carried by the container seat 500, the data obtainer 504 can obtain required data from the container. Other approaches may also be used.

The data obtainer 504 comprises a short range communication interface that is adapted to communicate with a data provider 20 carried by a container. For example, the data provider 20 carried by the container may comprise a memory. For example the data obtainer 504 may comprise an electrical coupling, such as conductive contacts, adapted to make contact with corresponding contacts carried by such a memory.

The processor 506 is coupled to these data obtainers and configured to collect the container data and to provide a signal based on it to indicate characteristics of the containers carried by the pallet 510. This signal may be a data signal to be sent to a remote device, for example over a wireless or wired communication interface, for example to a remote server and/or to a vehicle carrying the pallet 510. The signal may also comprise an alert signal, such as an audible or visible alert which can be triggered at the pallet 510 to indicate that a particular container should not be carried by the pallet 510. In some examples the signal may comprise a control signal for controlling a latch of a container seat 500 to restrain a container in a seat for transportation, or to reject it. For example, if the processor 506 determines that a container is to be accepted on to the pallet 510, it can control the latch to restrain the container to the container seat 500.

Figure 4A:
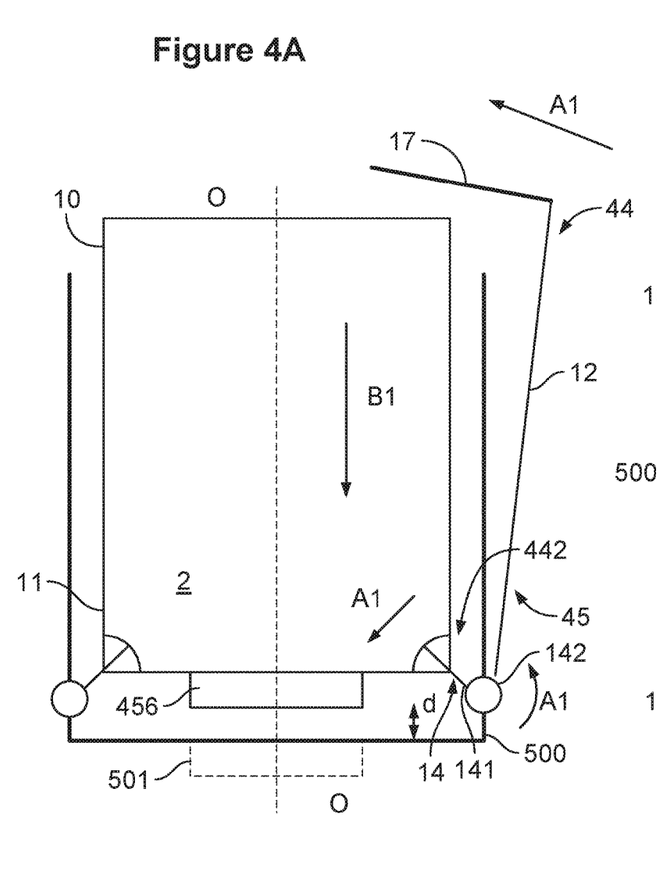
FIG. 4A shows a schematic illustration of a restraint for use in a container seat 500 of a pallet, the restraint of FIG. 4A comprises a locking and/or guiding mechanism with an actuator in a first condition.
Figure 4B:
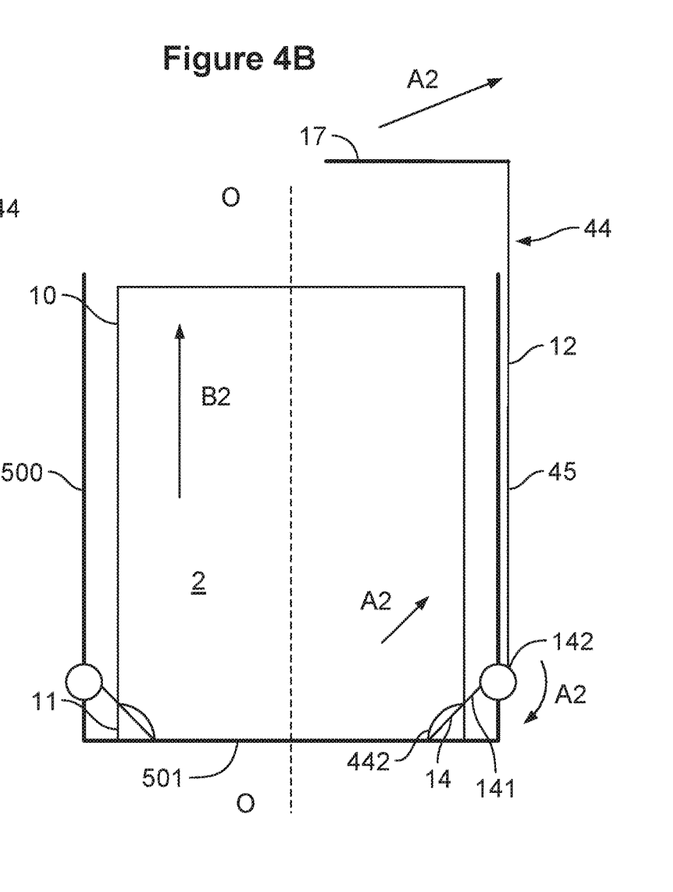
FIG. 4B shows a schematic illustration the restraint of FIG. 4A with the actuator in a second condition.

The restraint 502 may be a clip or cam, or a locking mechanism that engages with the container. An example of one such a restraint 502 is described below with reference to FIG. 4, but other restraints may be used.

In operation, a fluid container to be transported is presented to the pallet 510 by being placed in a container seat 500. The data obtainer 504 can then obtain container data from the data provider 20 carried by the fluid container. The processor 506 then determines, based on this container data what action if any may need to be taken. For example, the processor 506 can send a signal over a network to report the container data to a remote device such a server. In another example the processor 506 can send a signal to a restraint 502, such as a seat key or latch of the container seat 500, to inhibit removal of said container from the seat. In these embodiments the processor 506 may be configured to report the container data over the network after the container has been locked in place with the pallet 510. This may permit accurate and reliable inventory reporting as containers are collected onto the pallet 510.

In some possibilities, the processor 506 may determine from the container data that the container is to be rejected, and so may control the restraint 502, such as a seat key or latch, to inhibit carrying of the container by the seat. For example, the processor 506 may prevent the restraint 502 from securing the container to the seat.

Other alternatives and variations of this approach to collecting fluid containers are described below.

Another embodiment of the disclosure relates to a transporter, for example a transportation container such as a crate for carrying containers of fluid.

Figure 2:
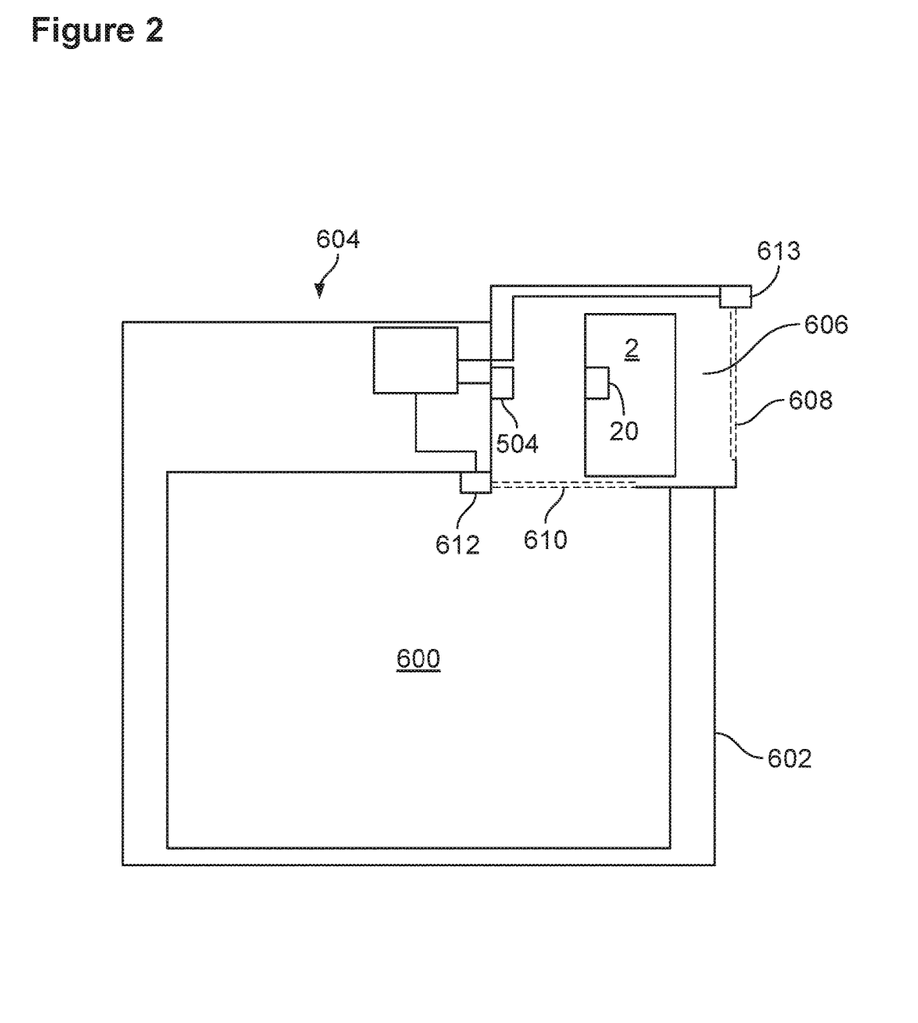
FIG. 2 shows a functional block diagram of a transporter apparatus.

FIG. 2 illustrates one example of such a transporter 604. As shown in FIG. 2 the transporter 604 comprises a carrier 600 surrounded by an enclosure 602 to inhibit entry of fluid containers to the carrier 600. An access controller is also provided, and controlled by a processor 506, to selectively permit or deny entry of fluid containers to the carrier 600 based on container data obtained from the containers.

As illustrated, the transporter 604 comprises a carrier 600 for carrying fluid containers, and this carrier 600 is surrounded by a secure enclosure 602. An opening in this enclosure 602 is obstructed by an access controller that is operable to selectively permit or deny entry of a fluid container into the carrier 600.

The transporter 604 of FIG. 2 comprises a processor 506 coupled to a data obtainer 504 for obtaining container data from a container that is presented to the access controller. The coupling of the processor 506 to the access controller comprises a control connection to an actuator of the access controller.

The data obtainer 504 of the transporter 604 may comprise any of the data obtainers described elsewhere herein, such as those described with reference to FIG. 1 above, or discussed below.

As illustrated, the access controller comprises a loading area 606 in which the fluid container is secured whilst data is obtained from the fluid container. The loading area 606 comprises an outer access port 608, through which a container can be introduced to the loading area 606. An actuator 613 is arranged to control this access port to enable, or inhibit, the entry or exit of a container through the first access port. The loading area 606 also comprises an inner access port 610, arranged to control the passage of fluid containers from the loading area 606 into the carrier 600. A second actuator 612 is arranged to control this port to enable, or inhibit, the entry of a container from the loading area 606 into the carrier 600.

The processor 506 is configured to sense that a container has been introduced to the loading area 606, for example based on a signal from a transducer coupled to the outer access port 608. The processor 506 may be further configured to control the outer access port 608 to inhibit removal of the container from the loader, and to obtain data from the fluid container in the loading area 606 using the data obtainer 504.

Once data has been obtained, the processor 506 can determine based on the container data, whether to allow that fluid container to be introduced to the carrier 600. In the event that the container is to be allowed into the carrier 600, the processor 506 controls the inner access port 610 to permit the container into the carrier 600. The processor 506 may also control the outer access port 608 to inhibit removal of the container from the loading area 606 whilst the inner access port 610 is open. The processor 506 may be configured to close the inner access port 610 in response to the outer access port 608 being opened.

This can enable the processor 506 to reliably determine which containers have been admitted to the carrier 600 by avoiding a situation in which data is obtained from one fluid container but then a second, different container is permitted entry to the carrier 600. For example, the access controller may operate in the manner of an air-lock or revolving door. Although an access controller using a loading area and two ports has been described, other examples of loaders can be used. In these and other embodiments, a single fluid container can be secured in an intermediate space of the loader such as the loading area 606 described above. For example this intermediate space may be enclosed by an outer shutter arranged to allow the container to be introduced into the space, and an inner shutter which obstructs entry of the container to the carrier 600. Data can be obtained from the container whilst it is secured by the access controller (e.g. by the outer shutter being held closed). In the event that the container data meets certain criteria, the access controller can be operated to allow that single fluid container entry to the carrier 600.

Systems of the present disclosure may be used for the distribution and/or collection of fluid containers, and of course may be involved in the delivery of those containers for recycling.

Figure 3:
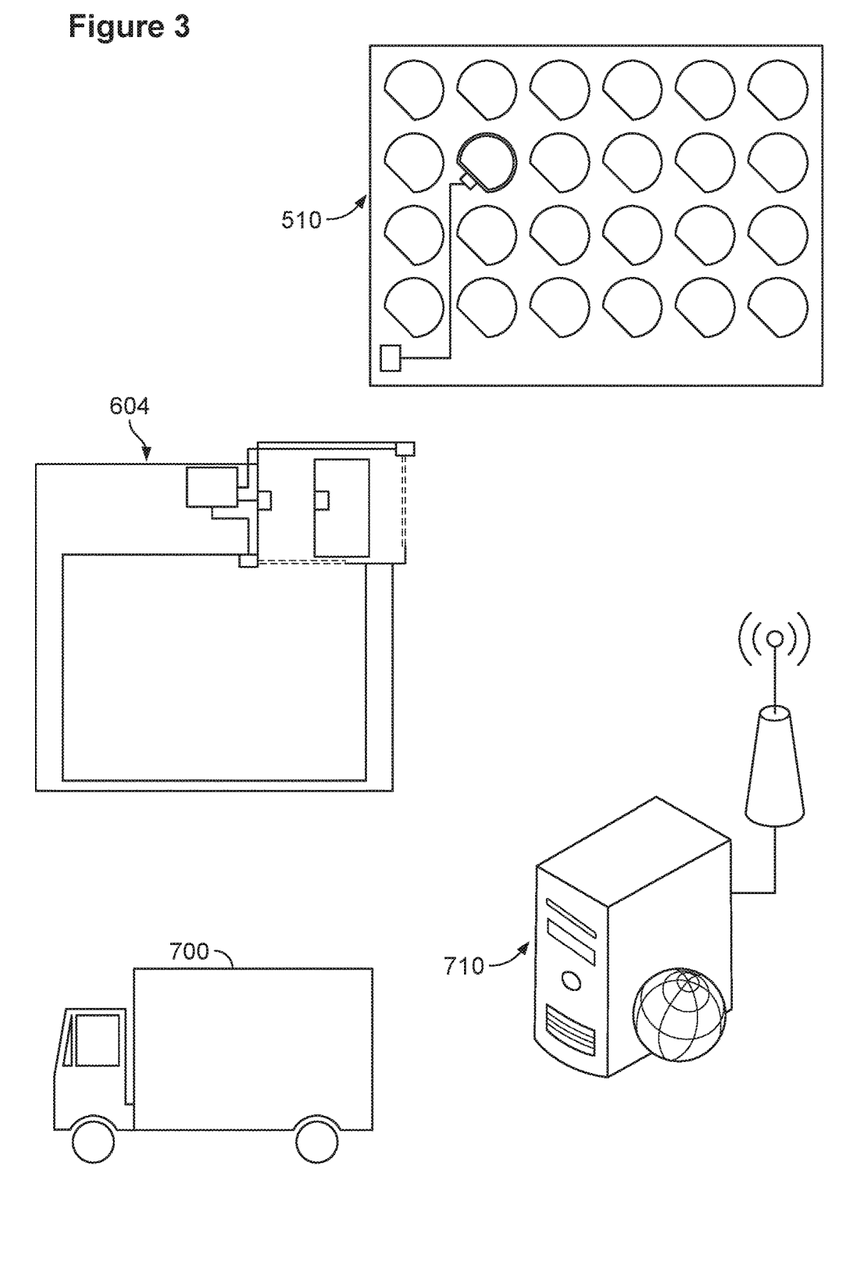
FIG. 3 illustrates a transportation control system.

FIG. 3 illustrates one such system. This system comprises a server 700 configured to communicate via a communications network, such as a wired or wireless communication network, for example a wide area network such as the internet. The server 700 communicates with pallets and/or transporters such as those described above. This server may receive, from one of these pallets or transporters, an identifier of a particular container, and optionally also other data obtained at the pallet 510 or transporter 604 this other data may comprise information relating to one or more of: the type of fluid purported to be carried by the container, a vehicle in which the container has been used, and a consumer or operator who has presented the fluid container to the pallet or transporter 604 for collection. This other data may also comprise measurement data obtained from performing a measurement of the fluid, for example by measuring its volume, weight, viscosity, opacity, conductivity or some other property. The server can then compare this other data with stored data associated with the identifier.

By checking the characteristics of the container in this way, the server can determine whether a particular container matches the information that is held about it, and then permit or deny its carriage by the pallet 510 or transporter 604 by sending a signal to the pallet 510 over the network. This same system may also enable the server to direct particular pallets or transporters to particular locations according to the inventory of containers held at those locations and/or carried by the pallets or transporters—for example the server may be configured to send a collection or delivery instruction to a vehicle based on container data obtained from pallets or transporters carried by that vehicle.

As illustrated in FIG. 4A and FIG. 4B the restraint 502 used in the container seats may comprise a locking mechanism 44 configured to cause the container 2 to cooperate with the container seats illustrated in FIG. 1. In the disengaged condition, the locking mechanism 44 is configured to allow the fluid container to be easily inserted or removed from the containers seat.

In the engaged condition, as illustrated in FIG. 4B the data provider 20 is arranged for data communication with the data obtainer 504. In the engaged condition, the locking mechanism 44 is configured to hold the fluid container 2 locked to the container seat 500 to inhibit, for example to prevent, removal of the fluid container from the container seat 500 by a user and/or operator of the pallet 510.

As schematically illustrated in FIG. 4A and FIG. 4B, the locking mechanism 44 may comprise an actuator 45 configured to cooperate with a complementary locking mechanism 442 of the fluid container 2.

The actuator 45 may be configured to be operated between a first condition (FIG. 4A) and/or a second condition (FIG. 4B).

In the first condition, the container 42 may be conveniently seated in and/or removed from the container seat 500 by the user and/or operator. To that effect, in the first condition, the actuator 45 is configured to engage a complementary locking mechanism 442 of the fluid container 2, in order to hold the fluid container 2 in the container seat 500.

In the second condition, the actuator 45 is locked to the complementary locking mechanism 442 of the fluid container 2, for example using mechanisms interlocking, such as latches, on the container 2 and on the seat 500, such as resilient and/or biased mechanisms cooperating and interlocking with conforming mechanisms, such as indents and/or grooves. As a result, in the second condition of the actuator 45, the container 2 cannot be removed from the seat 500. The actuator 45 needs to be in the first condition to enable the container 2 to be removed from the seat 500.

In some examples, the actuator 45 may comprise at least one lever 14. The lever 14 may be any type of locking arm or linkage with the container 2, such as for example a cam.

As a non-limiting example, the lever 14 may comprise a shaft 142, mounted to be able to rotate with respect to the container seat 500, and at least one arm 141 provided on the rotating shaft 142.

The complementary locking mechanism 442 of the container 2 may comprise a lever engaging surface 442 configured to cooperate with the lever 14. The lever engaging surface 442 may be any type of cooperating surface. As a non-limiting example, the lever engaging surface 442 may comprise an arm engaging surface 142 provided on the container 2, such as a recess, for example a groove provided on a surface of the container 2.

As schematically illustrated in FIGS. 4A and 48, the actuator 45 is configured to be movable (as shown by arrows A 1) with respect to the seat 500 in order to guide the fluid container 2 from the disengaged condition (FIG. 4A) into the engaged condition (FIG. 4B). As a non-limiting example, movement of the actuator 45 may cause the shaft 142 to rotate with respect to the seat 500. The rotation of the shaft 142 causes the arm 141 cooperating with the groove to hold the container in place in the seat as shown by arrow 81.

Additionally or alternatively, in some examples, the actuator 45 may further be configured to be movable (as shown by arrows A2) in order to guide the fluid container 2 from the engaged condition (FIG. 4B) to the disengaged condition (FIG. 4A). As a non-limiting example, movement of the actuator 45 causes the shaft 142 to rotate. The rotation of the shaft 142 causes the arm 141 cooperating with the groove to displace the container 2 to disengage the container 2, as shown by arrow B2.

In some examples, the actuator 45 is configured to guide the fluid container 2 from the disengaged condition (FIG. 4A) to the engaged condition (FIG. 4B) in a direction (as shown by arrow B1) normal to the base 501 of the seat 500. To that effect, the seat 500 may comprise a guiding mechanism 44 configured to control engagement of the fluid container 2 into the seat 500 from the disengaged condition to the engaged condition.

Additionally or alternatively, the actuator 45 may be configured to guide the fluid container 2 from the engaged condition (FIG. 4B) to the disengaged condition (FIG. 4A) in a direction (as shown by arrow B2) normal to the base 501 of the seat 500. To that effect, the seat 500 may comprise a guiding mechanism 44 configured to control disengagement of the fluid container 2 from the engaged condition to the disengaged condition.

To that effect, the actuator 45 may comprise at least two levers 14 provided on opposing parts of the actuator 45. The at least two levers 14 may be operated simultaneously, for example with respect to a mid-plane (O-O) as shown in FIG. 4A and FIG. 4B. The at least two levers 14 may be configured to cooperate with two corresponding lever engaging surfaces 442 of the fluid container 2. The symmetrical location and the simultaneous movement of the two levers 14 with respect to the plane (O-O) may thus enable the level displacement of the container 2 with respect to the seat 500 as mentioned above, with at least one of the associated advantages.

The actuator may comprise an electromechanical actuator, or other movement transducer, and the processor 506 of the pallet may be configured to control the actuator to lock a fluid container into a seat on the pallet, or to reject a fluid container from the pallet based on the container data associated with that fluid container.

The pallet and the transporter 604 described herein may carry a memory coupled to their processor 506 and configured to store one or more of:

data indicative of an expected container fluid level based on the mileage of the vehicle;

a first association (such as a look up table) associating container identifiers, or groups of container identifiers, with particular fluid types; and a second association (such as a look up table) associating data indicative of container fluid parameters, such as opacity, conductivity, viscosity or other parameters associated with usage of the fluid in a particular vehicle or class of vehicles, this data may comprise a model of these parameters as a function of mileage.

In these and other embodiments the processor 506 is operable to compare data stored in the memory with data obtained from the data provider 20 of a fluid container. The signal sent by the processor may comprise data obtained from this memory. For example, the processor may be configured to identify the fluid type (e.g. the type of lubricant such as synthetic or mineral oil) based on an identifier obtained from a data provider 20 of a container, and to send a signal identifying the fluid type, either to a remote device, or to use for controlling the restraint 502, or for triggering an audible or visible alert as explained above.

The processor may also be configured to obtain data indicative of the fluid type, for example using the first association or directly from the data provider 20, and to use the second association to obtain fluid parameters describing the fluid that should be carried by the container. These parameters can be reported to a remote device, or stored locally, or used to test against measurement data obtained from testing the fluid in the containers to determine whether, and perhaps also how, the fluid is to be recycled.

The data obtainer 504 may comprise a wireless communication interface, examples of such wireless communication interfaces comprise optical, capacitive and/or inductive communicators. Examples of such interfaces include near field communicator such as a capacitive or inductive coupling interface such as might be provided by near field RF communicators for example NFC and RFID communicators.

The data obtainer 504 may comprise a wired communication interface arranged to couple with contacts carried by the container for electronic or optical communication. This pallet also carries a processor configured to enable or inhibit the carrying of a particular container based on data obtained from that particular container. This processor may determine from the data whether to retain a particular container in a seat on the pallet, or to reject that container. In some embodiments the processor may be configured to store the container data, or to send it over a wide area network to a remote device, such as a server. This remote device may send control signals back to the pallet to cause the processor to reject or retain a particular container, and/or to direct delivery of the pallet to a particular location based on the container data.

The data provider may comprise electronic memory as noted above, and the data obtainer may be configured to read this memory to obtain data comprising at least one property of the fluid selected from the group consisting of: the amount of fluid, the temperature of fluid, the pressure of fluid, the viscosity of fluid, the viscosity index of the fluid, the density of fluid, the electrical resistance of fluid, the dielectric constant of fluid, the opacity of fluid, the chemical composition of fluid, the origin of the fluid and combinations of two or more thereof. The memory may also be configured to receive data from an engine control device. This enables data to be stored at the container. Such stored data can then be provided from the memory to diagnostic devices during servicing and/or during replacement of the container. The amount of fluid includes the absence of the fluid.

The memory is optional. The computer readable identifier may be an optical identifier, such as a barcode, for example a two-dimensional barcode, or a colour coded marker, or optical identifier on the container. The computer readable identifier may be provided by a shape or configuration of the container or text of some kind. Regardless of how it is provided, the identifier may be encrypted. The data obtainer may comprise an optical reader configured to read any or all of these types of identifiers.

The pallet may be a single unitary item or may be made up of a number of modules which may be coupled or stacked together, for example the modules may be crates that may be stacked to produce a three dimensional or two dimensional pallet. Also, individual pallets, whether or not made up of modules, may be coupled together to form a larger pallet.

A pallet may be configured to cater for different shapes and/or sizes of fluid container. As an example, a pallet may be made up of modules each of which module is designed to seat a particular size and/or shape of container or a pallet may have different seats designed to receive different shapes and/or sizes of container. As another possibility, the seats may be designed to be capable of receiving different sizes and/or shapes of container, for example conical or frustro-conical or otherwise tapered seats may be provided so that smaller containers may be seated lower down in the seats and larger containers higher up in the seats. Also, the shape of the seats may be configured so that different cross sectional shapes of containers may be received within the seats, for example a hexagonal cross section seat may be able to receive smaller containers of circular, rectangular, square or triangular cross section, as a possibility.

In embodiments, the pallet and/or a separate communications device may have the facility to communicate with containers.

In embodiments, modification of containers admitted to a pallet or transporter may be allowed, for example draining of fluid from the containers may be allowed, either in transport or at a given location.

Examples of containers that may be carried by pallets and transporters of the present disclosure are described in International patent application PCT/EP2013/074209, the entirety of which is hereby incorporated by reference.

With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

The activities and apparatus outlined herein may be implemented using controllers and/or processors which may be provided by fixed logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof.

The invention claimed is:

1. A pallet comprising:
   a plurality of container seats, wherein each container seat is adapted to carry a fluid container, wherein each container seat is operable to retain the fluid container so as to inhibit removal of the fluid container from the container seat, and wherein each container seat is operable to reject the fluid container so as to inhibit carrying of the fluid container by the container seat;
   a data obtainer arranged to obtain container data from a data provider carried by a particular fluid container to be carried by the pallet; and
   a processor coupled to the data obtainer and configured to provide a signal based on the container data, wherein the signal comprises an indication as to whether to retain or reject the particular fluid container from which the container data was obtained.

2. The pallet of claim 1 wherein the processor is coupled to provide the signal to a particular container seat of the plurality of container seats to control the particular container seat.

3. The pallet of claim 1 comprising a wireless communication interface coupled to the processor for communicating with a remote device.

4. The pallet of claim 3 wherein the processor is configured to provide the container data to the remote device.

5. The pallet of claim 4 wherein the signal is based on data received from the remote device in response to the container data.

6. The pallet of claim 1 wherein each container seat of the plurality of container seats comprises a seat key to engage with a complementary key of a fluid container that is to be carried by the container seat and the data obtainer is configured to obtain data from the container seat in response to the seat key engaging with the fluid container.

7. The pallet of claim 6 wherein, for each container seat of the plurality of container seats, the seat key is configured to limit at least one of the position and orientation of the fluid container carried by the container seat so that when the seat key is keyed with the fluid container, the fluid container is arranged to provide data to the data obtainer.

8. The pallet of claim 7 wherein the data obtainer is configured to obtain data from a fluid container seated in a particular container seat of the plurality of container seats in response to the seat key of the particular container seat engaging with a complementary key of the fluid container.

9. The pallet of claim 8 wherein the seat key comprises at least one of a latch and an asymmetric geometry of the container seat.

10. The pallet of claim 1 wherein the signal comprises at least one of an audible or visible alert signal.

11. The pallet of claim 1 wherein the data obtainer comprises at least one of a wireless or wired electronic communication interface configured to communicate with a fluid container seated in a particular container seat of the plurality of container seats.

12. The pallet of claim 11 wherein the data obtainer is configured to obtain measurement data indicating at least one property of a fluid carried in the fluid container seated in the particular container seat.

13. The pallet of claim 12 wherein the processor is configured to provide the signal based on comparing the measurement data with container data obtained from a machine readable property of the fluid container seated in the particular container seat.

14. The pallet of claim 1, wherein a particular container seat of the plurality of container seats is operable to retain the particular fluid container so as to inhibit removal of the particular fluid container from the particular container seat in response to the particular container seat receiving the signal comprising an indication to retain the particular fluid container.

15. The pallet of claim 1, wherein a particular container seat of the plurality of container seats is operable to reject the particular fluid container so as to inhibit carrying of the particular fluid container by the particular container seat in response to the particular container seat receiving the signal comprising an indication to retain the particular fluid container.

16. A pallet comprising:
    a plurality of container seats, wherein each container seat is adapted to carry a fluid container, and wherein each container seat comprises a seat key to engage with the fluid container that is to be carried by the container seat;
    a data obtainer arranged to obtain container data from a data provider carried by a particular fluid container to be carried by the pallet, wherein the data obtainer is configured to obtain data from a particular container seat of the plurality of container seats in response to the seat key of the particular container seat engaging with the particular fluid container; and
    a processor coupled to the data obtainer and configured to provide a signal based on the container data.

17. The pallet of claim 16 wherein, for each container seat of the plurality of container seats, the seat key is configured to limit at least one of the position and orientation of the fluid container carried by the container seat so that when the seat key is keyed with the fluid container, the fluid container is arranged to provide data to the data obtainer.

18. The pallet of claim 16 wherein the data obtainer is configured to obtain data from a fluid container seated in a particular container seat of the plurality of container seats in response to the seat key of the particular container seat engaging with a complementary key of the fluid container.

19. The pallet of claim 16 wherein the seat key comprises at least one of a latch and an asymmetric geometry of the container seat.

20. The pallet of claim 16 wherein each container seat of the plurality of container seats is operable to retain the particular fluid container so as to inhibit removal of the particular fluid container from the container seat.

21. The pallet of claim 16 wherein each container seat of the plurality of container seats is operable to reject the particular fluid container so as to inhibit carrying of the particular fluid container by the container seat.

22. The pallet of claim 16 wherein the signal comprises an indication as to whether to retain or reject the particular fluid container from which the container data was obtained.

23. The pallet of claim 16 wherein the processor is coupled to provide the signal to a particular container seat of the plurality of container seats to control the particular container seat.

24. The pallet of claim 16 comprising a wireless communication interface coupled to the processor for communicating with a remote device.

25. The pallet of claim 24 wherein the processor is configured to provide the container data to the remote device.

26. The pallet of claim 25 wherein the signal is based on data received from the remote device in response to the container data.

27. The pallet of claim 16 wherein the signal comprises at least one of an audible or visible alert signal.

28. The pallet of claim 16 wherein the data obtainer comprises at least one of a wireless or wired electronic communication interface configured to communicate with a fluid container seated in a particular container seat.

29. The pallet of claim 28 wherein the data obtainer is configured to obtain measurement data indicating at least one property of a fluid carried in the fluid container seated in the particular container seat.

30. The pallet of claim 29 wherein the processor is configured to provide the signal based on comparing the measurement data with container data obtained from a machine readable property of the particular fluid container.

* * * * *